United States Patent
Nielsen et al.

(10) Patent No.: US 6,262,377 B1
(45) Date of Patent: *Jul. 17, 2001

(54) METHOD AND A SYSTEM FOR BUILDING UP WEIGHED-OUT PORTIONS OF OBJECT

(75) Inventors: Ulrich Carlin Nielsen, Ry; Søren Poulsen, Mundelstrup; Henrik Grundtvig, Risskov; Jesper Skovsgard, Skanderborg, all of (DK)

(73) Assignee: Scanvagt A/S, Arhus (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/161,464

(22) Filed: Sep. 28, 1998

Related U.S. Application Data

(62) Division of application No. 08/578,655, filed as application No. PCT/DK94/00279 on Jul. 6, 1994, now Pat. No. 5,813,195.

(30) Foreign Application Priority Data

Jul. 6, 1993 (DK) .................................... 0805/93

(51) Int. Cl.$^7$ .............................. B65B 1/32; G01G 9/00; G01G 13/02
(52) U.S. Cl. ................................. 177/1; 177/52; 177/105; 177/119; 53/443; 53/501; 209/592
(58) Field of Search ................................. 177/25.18, 145, 177/119, 118, 117, 116, 52, 120, 121, 122, 1, 105; 53/502, 443, 501; 209/592, 593, 594, 595, 596

(56) References Cited

U.S. PATENT DOCUMENTS

| | | | |
|---|---|---|---|
| 3,492,779 | 2/1970 | Russell | 53/501 |
| 3,705,475 | 12/1972 | Riley | 53/475 |
| 3,720,276 | 3/1973 | Banks | 177/122 |
| 3,738,077 | 6/1973 | Leach | 53/502 |
| 4,021,336 * | 5/1977 | Brook et al. | 209/592 |
| 4,096,950 * | 6/1978 | Brook | 209/592 |
| 4,385,670 * | 5/1983 | Braun et al. | 177/1 |
| 4,418,772 * | 12/1983 | Fukuda | 177/1 |
| 4,426,006 * | 1/1984 | Horii et al. | 177/145 |
| 4,428,179 | 1/1984 | Jordan et al. | 53/502 |
| 4,450,073 * | 5/1984 | Burnett et al. | 209/593 |
| 4,487,277 * | 12/1984 | Morita et al. | 177/25.18 |
| 4,491,189 * | 1/1985 | Fukuda | 177/1 |
| 4,519,506 * | 5/1985 | Spaanderman Cornelis | 209/592 |
| 4,660,665 * | 4/1987 | Powell, Jr. | 177/145 |
| 4,720,961 | 1/1988 | Jordan | 53/501 |
| 4,821,820 * | 4/1989 | Edwards et al. | 177/25.18 |
| 5,246,118 * | 9/1993 | Mosher | 177/52 |
| 5,889,235 * | 3/1999 | Kawanishi et al. | 177/25.18 |
| 5,998,740 * | 12/1999 | Kvisgaard et al. | 177/25.18 |

* cited by examiner

*Primary Examiner*—Randy W. Gibson
(74) *Attorney, Agent, or Firm*—Antonelli, Terry, Stout & Kraus, LLP

(57) ABSTRACT

Based on a non-orderly flow of supplied articles, which may also be sticky articles of food, there is effected in a compulsory manner an isolation of mutually separated small article portions, which are moved through a weighing station (20) and thereafter brought together selectively into larger portions, e..g, with a predetermined weight. In a preferred system according to the invention use is made of an endless row of carrier trays (12) which, in two straight runs, pass along a number of receiver containers (22), into which they are selectively emptied after having passed the weighing station. In front of this station distributor means (14, 18) are provided above a horizontal reversing path of the tray chain for ensuring that the supplied articles are distributed to the trays without overlapping therebetween. Various advantageous embodiments of the single parts of the system to work with a desirably high capacity. According to choice, the system may be used for sorting purposes or for the building up of article portions according to batching or combination weighing principles.

1 Claim, 7 Drawing Sheets

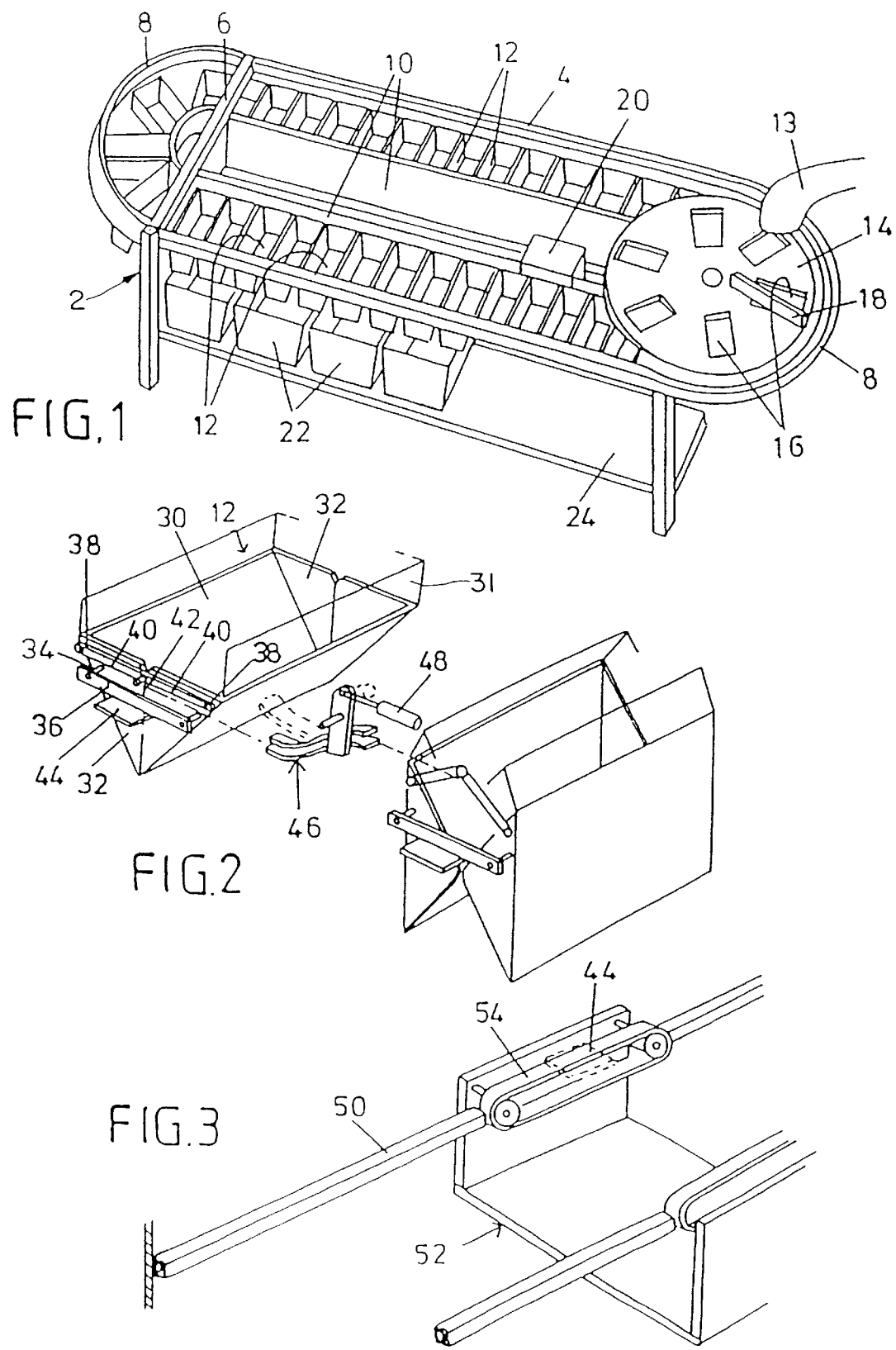

Figure 8:
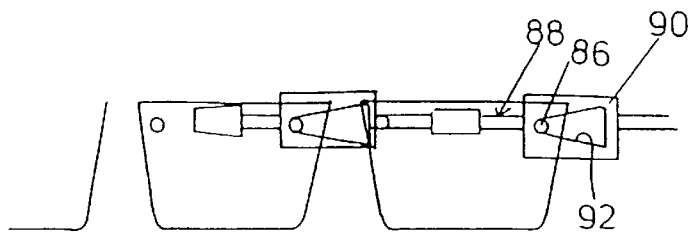

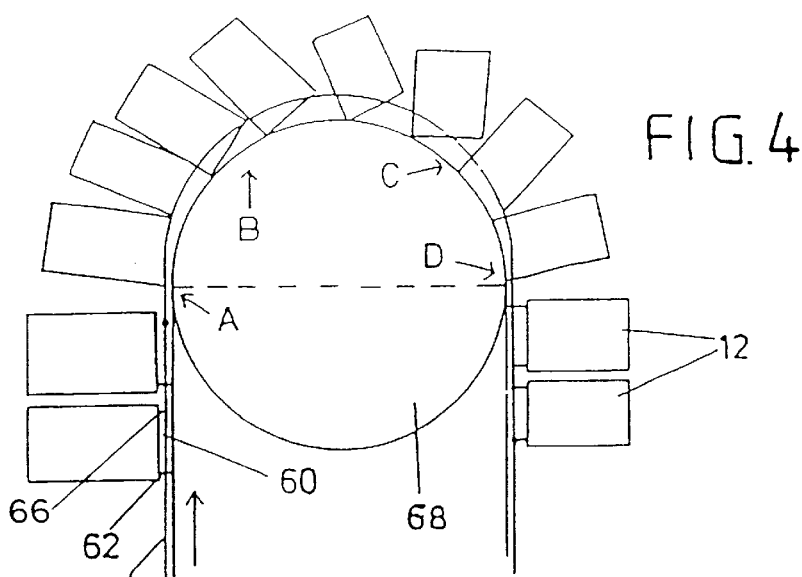
FIG. 4
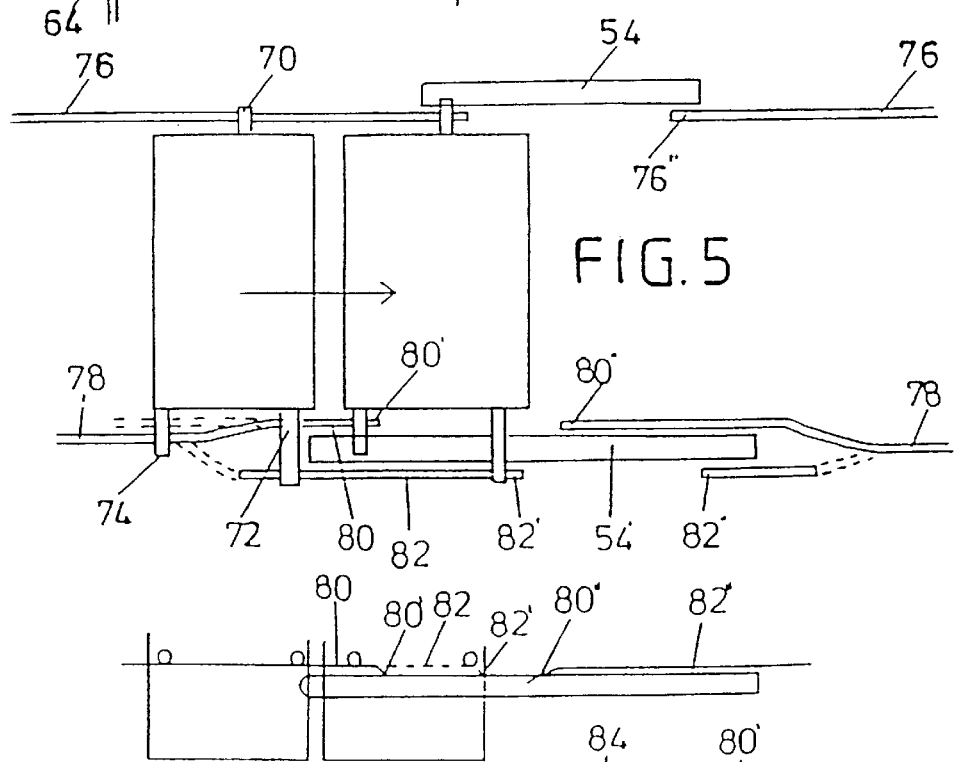
FIG. 5
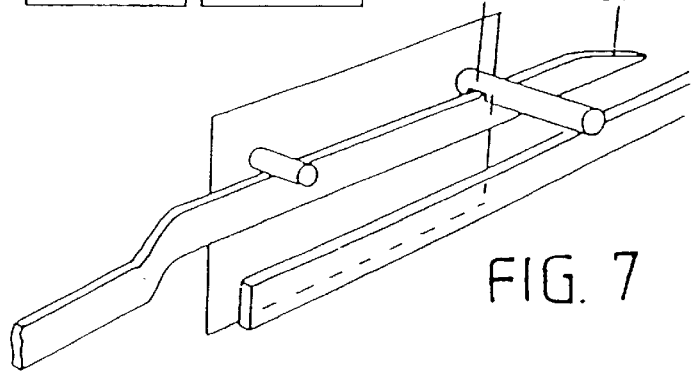
FIG. 6
FIG. 7

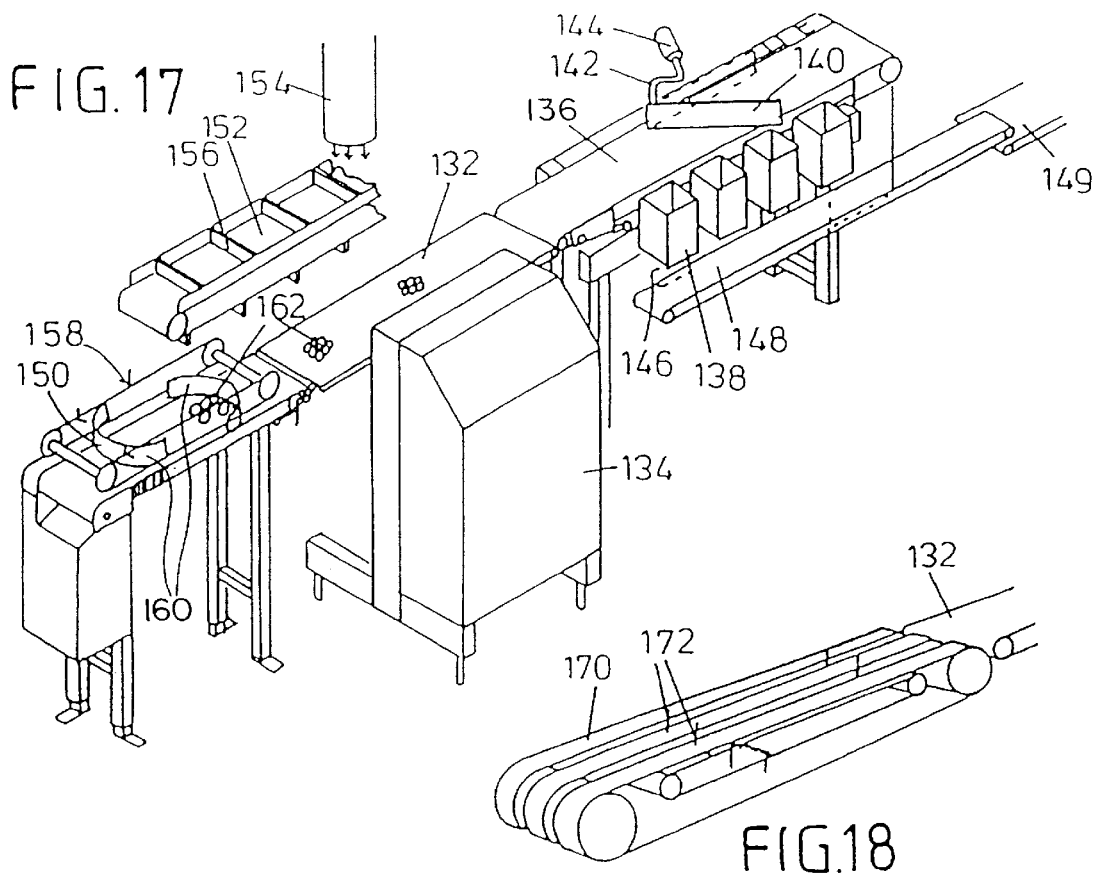
FIG. 17
FIG. 18
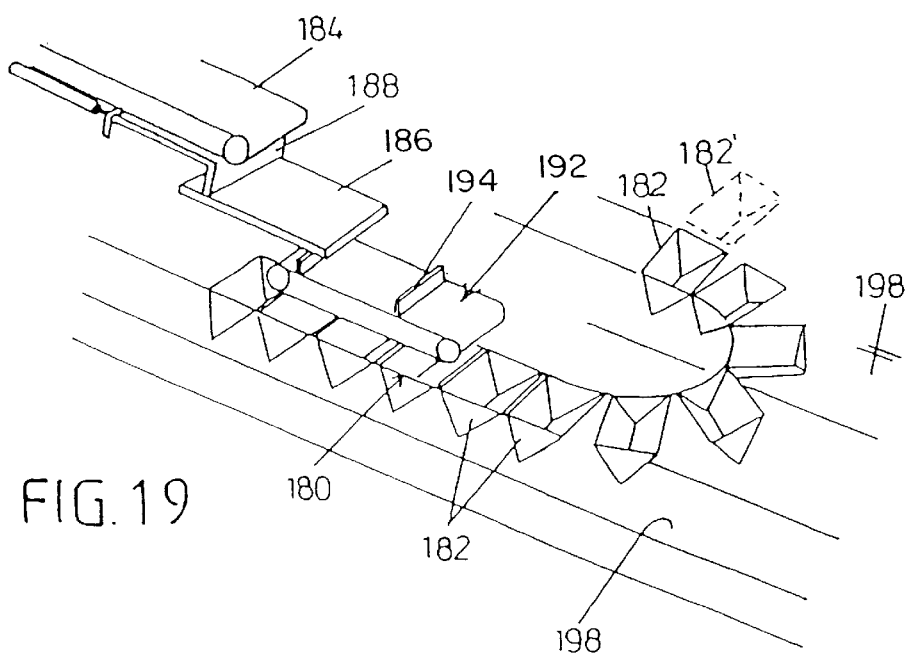
FIG. 19

METHOD AND A SYSTEM FOR BUILDING UP WEIGHED-OUT PORTIONS OF OBJECT

RELATED APPLICATIONS

This application is a Divisional of application Ser. No. 08/578,655, filed Jan. 5, 1996, now U.S. Pat. No. 5,813,195, issued Sep. 29, 1998, which in turn is a filing under 35 U.S.C. §371 of PCT/DK94/00279, filed Jul. 6, 1994, claiming priority of Denmark application number 0805/93, filed Jul. 6, 1993.

FIELD OF THE INVENTION

The present invention relates to a method and a system for isolating from an unordered flow of objects smaller or larger object groups which, upon being weighed, are brought to a temporary storing in containers, from which they can later on be let out for delivery in combination with other weighed object groups for forming respective total object groups with a desired total weight, these collected larger groups then being transferable to a packing station.

BACKGROUND OF THE INVENTION

The invention is primarily related to the handling of foodstuff pieces, e.g. for making portions of fish or chicken pieces. It is known that portions of such pieces can be built up by currently weighing the successively supplied pieces on a dynamic weight and thereafter, dependent of the weighing results, effect a selective supply of the pieces to different receiver containers placed along a further extending conveyor. What can be aimed at is that in the single containers total portions can be built up so as to have a desired weight, but it is required that the pieces are supplied one by one, such that an associated computer may all the time keep track of where the pieces are located.

With another known method for the making up of object portions the principle of combination weighing is used, whereby an unordered flow of objects is distributed so as to be received as undetermined portions in a number of weighing containers, in which the portions are weight determined, whereafter the computer looks for portions giving a total of the desired ultimate portion weight. Thereafter just these selected subportions are released into an underlying collector unit, typically a large hopper, from which they are delivered as one portion. For ensuring a good capacity it is actual here to make use of a considerable number of weighing units, and besides, these weighing systems, having the weighing units arranged in a straight or circular row, normally exhibit a considerable building height, because normally they comprise slanting sliding chutes for the objects/subportions. This also implies that these systems may well be suited for dry and rigid products, e.g. pastils and root crops, but not for soft and adhering products. For the invention it is a basic consideration that it will be possible to use the first mentioned working principle, i.e. using only a single dynamic weight, without the feeding flow of objects being ordered in consisting of single objects conveyed mutually spaced, namely if care is taken that an unordered feeding flow is caused, in a compulsory manner, to be separated in mutually spaced subportions, whether these comprising a single or more objects, prior to being fed to the dynamic weight. Hereby it is made possible to operate with the dynamic weighing even when the feeding flow is unordered, and also to operate with weighing portions comprising more objects; conventionally, the discussed weighing and sorting out principle has been associated with the handling of single objects, but it is highly advantageous when also plural object portions can be handled.

From EP-A-0,534,889 a combination weight using but a single weighing unit is known; an annular row of receiving containers, which would conventionally be stationary and each associated with a weighing unit, is arranged to be circularly movable such that the containers are successively passed over a weighing unit which, with deduction of tare, measures the weight of the single portions in the containers; these subportions may then be discharged in suitable combinations for collection in an underlying hopper, for which it is immaterial whether the circular container row rotates or stands still.

In this known portioning apparatus the supply of the unordered flow of objects takes place on a conveyor down to a fixed dropping area above the rotating ring of receiver containers. Thus, already by their passage of this area, the containers themselves will constitute the means required for separating the flow to the different containers, and vis-a-vis the invention the containers may thus be considered as means for achieving an ordering of the supply flow in mutually separated portions, which may then be weighed. It is here important, however, that while such a technique may be well suited for the handling of dry objects such as onions or other examples stated in said EP-A-0,534,889, it is absolutely unsuitable for the handling of soft, sticky objects. When supplied in the manner described an object of this type may well be deposited across the joint between two neighbouring containers, without rolling or sliding down therefrom, and the result will be highly disordered weighings and spoiled possibilities of an orderly delivery of the objects from the containers.

It is to be stressed, therefore, that the portioning separation of the supply flow of objects according to the invention has to be effected and terminated prior to the objects or groups of objects being fed to such moved containers or at least in direct connection with the feeding thereto, inasfar as it is acknowledged by the invention that despite the deviating approach it may still be very advantageous to effect the weighing in of the objects or object groups by a weighing of receiver containers that are moved in a closed path.

This requirement of a pre-portioning of the object flow makes it difficult to arrange the separation in such a manner that the objects or object groups follow each other so closely that they can be delivered with required safety to receiving containers advanced without mutual spacing. Normally it will be actual to arrange for the separation by some sort of forward or rearward pushing of objects in the arriving main flow for effectively overcoming the said overlapping problem, so the containers should be somewhat interspaced during the filling thereof. Thereafter the containers may well be brought together so as to take up a minimum of operative space.

Thus, it is hardly possible to use the carrousel principle disclosed in EP-A-0,534,889, where the containers are closely juxtaposed all the way round. The principle, at least, will have to be modified such that the containers are successively accelerated through a free path in connection with the filling; however, in connection with the invention it will normally be desired to use so many and so large containers that space requirements will make it non-desirable to use a circular system. It is already known from various systems with round-moving containers or conveyor trays to arrange these in such a manner that they are advanced by a chain in two straight, parallel runs between opposed sprocket wheels, and this is as tailored for the invention, because the containers may then be moved with close juxtaposition along the straight runs, while at the sprocket wheels they will radiate from these, i.e. they will exhibit increased mutual spacing, even when still being close to each other at their inner ends. By the associated swinging away from each other the containers will be loadable by marked separated object groups, such loading being possible in different ways.

SUMMARY OF THE INVENTION

With the invention it is a preferred possibility to mount above at least one of the sprocket wheels a co-rotating cover disc projecting over the open top sides of the moved receiver containers or bowls and provided with throughholes with shape and location just corresponding to the underlying bowls. During the rotation of the sprocket wheel each of these holes will thus follow an underlying bowl while the latter moves 180° along the wheel, whereby the generally triangular spaces between the bowls will constantly be covered by the rotating disc. Thus, an unordered flow of objects may be supplied to this area, where it may be rearranged on the plate by suitable guiding and scraping means so as to be fed to the holes and therewith to the bowls, prior to these successively leaving the area. It is ensured thereby that the object groups or single objects fed to the bowls really become isolated in the single bowls, such that these may then be brought closely together and be weighed individually on the dynamic weighing unit.

A portioning system according to the invention may be used based on the accumulative as well as the combination weighing principle, i.e. for the building up of portions either in receiving containers arranged rowwise underneath the moving path of the trays for selective reception of articles unloaded from the trays, whereby these containers may then deliver the ready-accumulated portions to an underlying conveyor, or in that single portions are unloaded from the trays/containers so as to fall down or be guided down on such a conveyor in order to be brought together into a combination portion with a desired weight. Such a bringing together may well be effected by means of a horizontal conveyor, also with the use of parallel conveyors along the said straight stretches of the moving path of the trays, as it is possible by means of a suitable control equipment to arrange for a coordinated delivery of the articles or article portions to a cross moving collector conveyor, on which the different portions may then be brought together for the formation of the combination portion. This arrangement will not require any noticeably increased building height of the system, and nonetheless the system may operate with sticky articles, which, in a circular combination weigher, would require pronounced inclined sliding surfaces and therewith an extra large building height.

Moreover, the system will be usable for effecting sorting jobs, e.g. for the building up of portions of a predetermined number of articles and of uniform weights, though this will require the articles to be fed one by one.

It has been mentioned that the preferred solution will be to feed the articles or article portions to a row of moved trays, which are successively weighed on a dynamic weighing unit, but this will not influence the fact that the invention may also be realized based on its basic principle, which is the division of a supplied unorderly flow of articles into mutually separated article groups, which, after being weighed on a dynamic weighing unit, are brought further to a conveyor, from which the articles or article portions are selectively let out to receiver containers arranged along the conveyor, without the use of any moved containers or trays.

Figure 9:
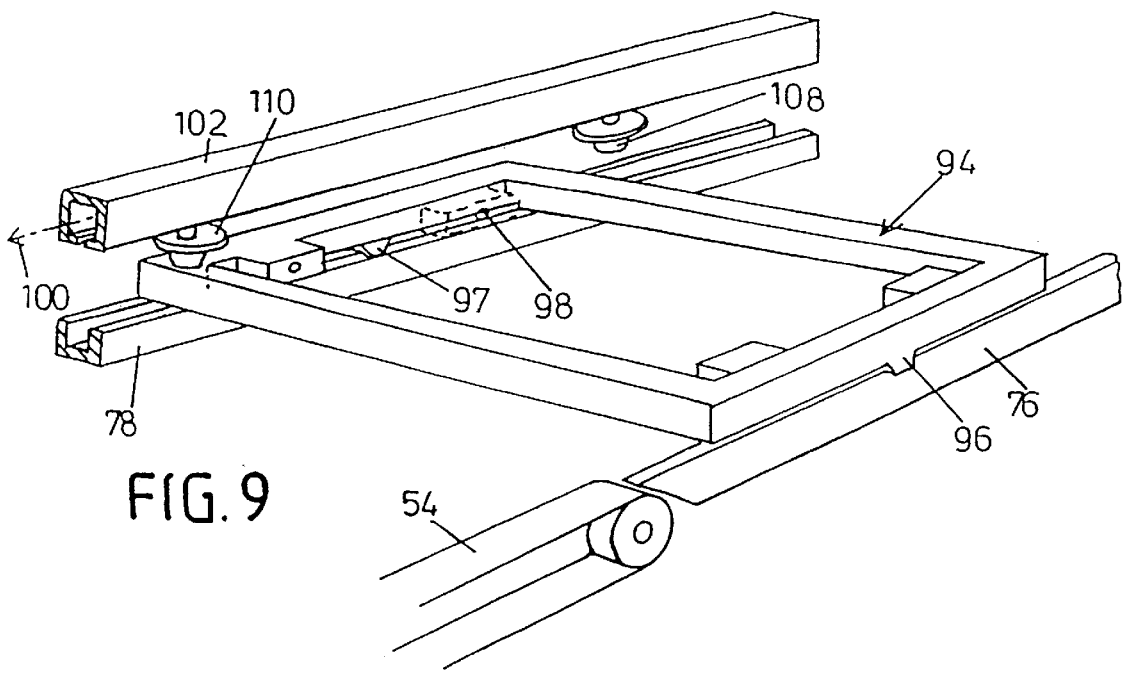
Figure 10:
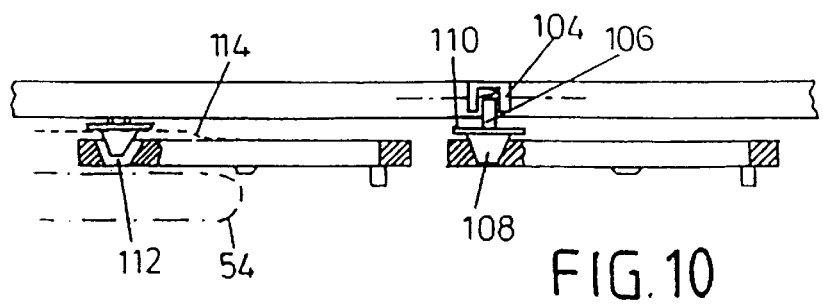
Figure 11:
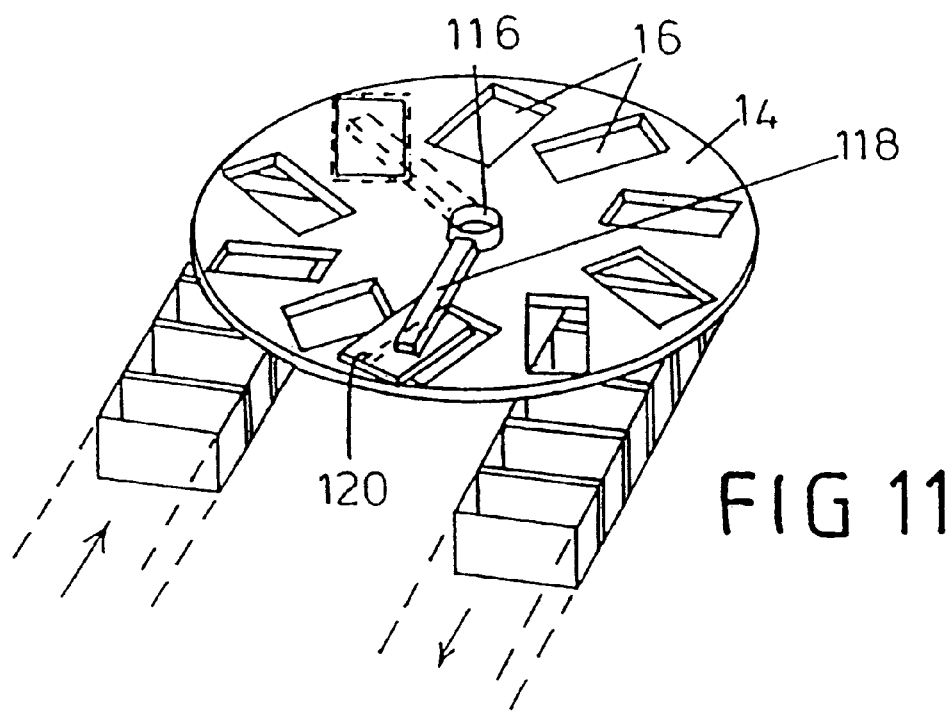
Figure 12:
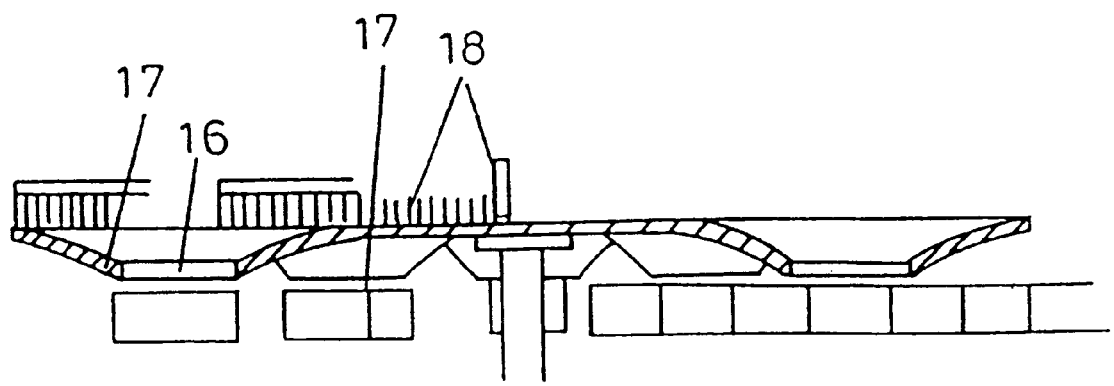
Figure 13:
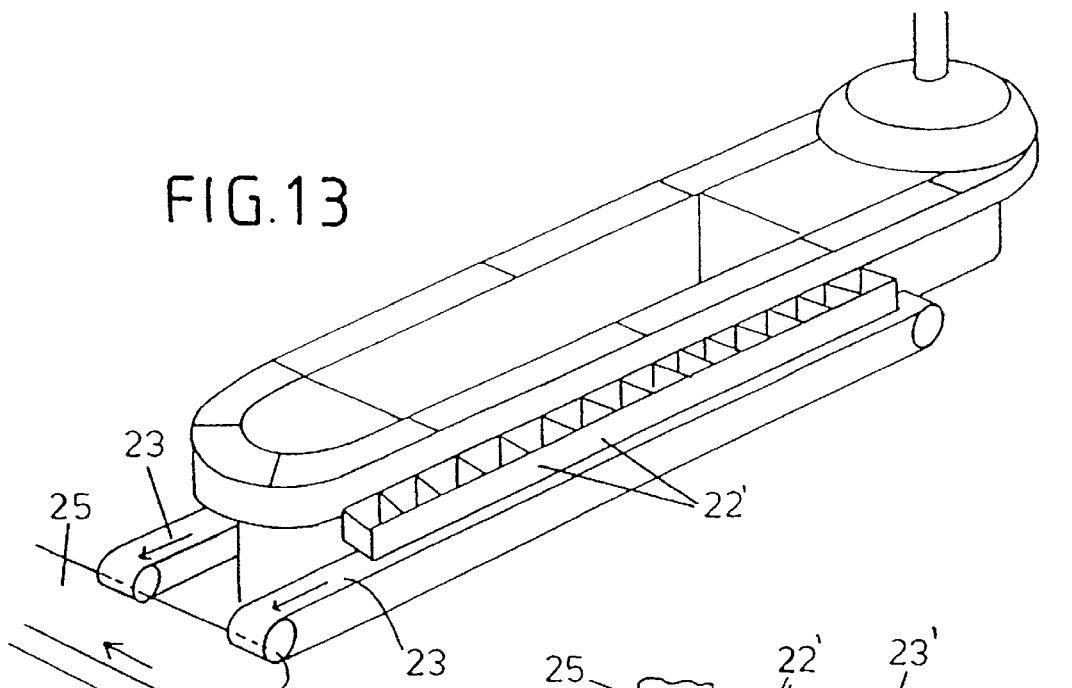
Figure 14:
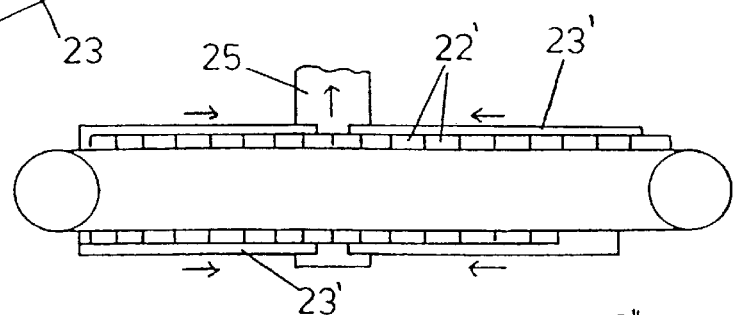
Figure 15:
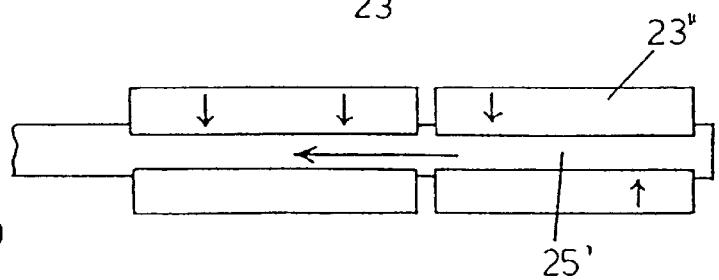
Figure 16:
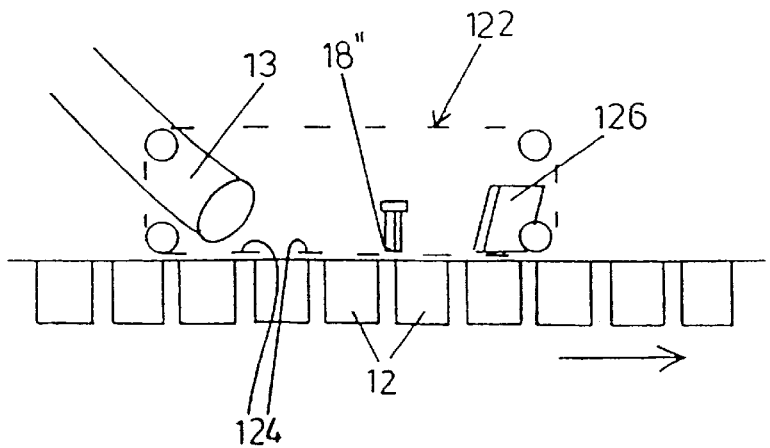
Figure 20:
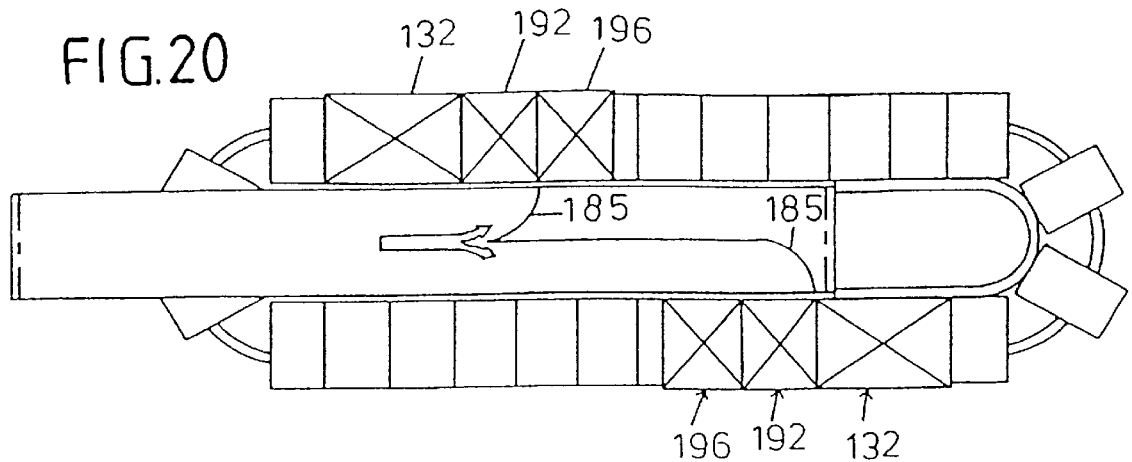
Figure 21:
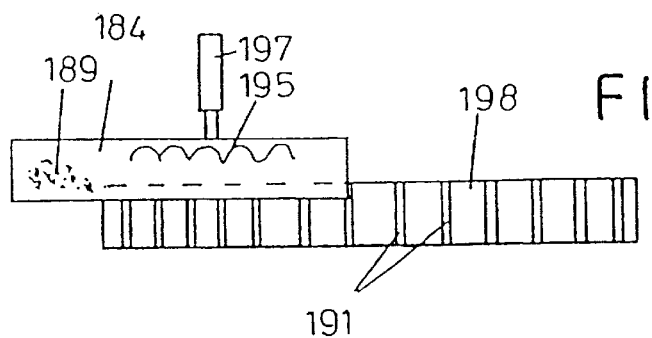
Figure 22:
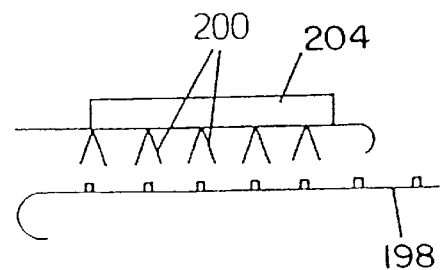

In the following the invention is explained in more detail with reference to the drawing, in which:

FIG. 1 is a schematic perspective view of a weighing out system according to the invention, FIG. 2 is a perspective view of a couple of trays of a preferred design used therein, FIG. 3 is a corresponding, schematic view of a weighing station of the system, FIG. 4 is a top view of an end portion of the system, FIGS. 5–7 are schematic views illustrating a preferred embodiment of the weighing station, FIG. 8 is a lateral view of a driving system of the trays, FIGS. 9 and 10 are schematic views illustrating a preferred suspension system for the trays, FIG. 11 is a perspective view of the end of the system shown in FIG. 4, FIG. 12 is a cross sectional view of a modified cover disc according to FIG. 11, FIG. 13 is a perspective view of a special design of the system, FIGS. 14 and 15 are top views of conveyor means underneath system, FIG. 16 is a schematic view illustrating a modified infeed system, FIG. 17 is a perspective view of another embodiment of a system according to the invention, FIG. 18 is a perspective view of a modified infeeder unit of the system, FIG. 19 is a similar view of a modified embodiment thereof, FIG. 20 is a top view of a system having two infeed areas, and FIGS. 21 and 22 are schematic lateral views of modified infeed units.

DETAILED DESCRIPTION OF THE DISCLOSED EMBODIMENTS

The system or apparatus shown in FIG. 1 has a frame chassis 2 with longitudinally extending beds 4 and transverse end beds 6, outside which the beds 4 are mutually connected by means of semicircular frame portions 8. Between the end beds 6 there extend in a central area two mutually separated, depending wall portions 10, the outsides of which form guiding surfaces for a roundgoing chain row of weighing trays 12, which is driven by a non-illustrated traction station at the right hand end of the apparatus. At their outer ends the said trays are carried in carrier tracks in the bed portions 4, 8, optionally in wall plate portions depending therefrom.

To the right is shown a turntable 14, which rotates in synchronism with the chain movement and is provided with a number of holes 16, which during operation will be located just overhead the trays 12 passing around at this end of the apparatus, radiating from the associated sprocket wheel of the chain, while the trays 12 otherwise, along the straight runs, are closely juxtaposed.

Above the inlet side of this turntable is mounted a supply conveyor or conduit 13 for articles to be weighed out in portions. The articles are supplied in a reasonably even flow, adapted to the capacity of the apparatus, and they fall freely down onto the disc 14, whereby they are caused to fall down through the holes 16, partly naturally and partly in a compulsory manner by meeting a shuffle plate 18 or one or more corresponding shuffle brushes, whereby the passing trays 12 will receive just more or less equal article portions.

Immediately when leaving this area the partly filled trays 12 pass a weighing station 20, in which the trays are lifted free of their conveying means and are weighed successively, the individual weighing results being currently transferred to a non-illustrated computer. Prior to operation, the row of empty trays may be circulated one or more times, whereby the computer may register the tare weight of the single, numbered trays, to thereafter make the tray contents weighable with the required accuracy.

The trays 12 are made with an openable bottom so as to be able to empty their contents at desired places, subject to computer actuation of releaser means (not shown), whereby they may be selectively emptied into underlying receiver containers 22 mounted on carrier means 24 along both of the straight runs of the tray chain.

Alternatively, along these lower, straight stretches there may be provided compartment conveyors for receiving the unloaded articles or portions and bringing them to a desired place of reception, e.g. also a transverse conveyor for uniting single portions from the two stretches. The compartments of the conveyors will make sure that the portions be kept mutually isolated, and the computer will know at any time which weighing portions, single or combined, are present in the different compartments along the conveyor stretches. Hereby a large register may be available with respect to the formation of combination portions. These portions, of course, may also be formed by unloading from the containers 22, if these are openable in a computer controlled manner down against underlying take-away conveyors.

Trays 12 of a preferred design are schematically illustrated in FIG. 2. They are made of two planar side plates 30 having at their ends orthogonally bent out, triangular end plates 32, the outer pointed ends of which are permanently held together in an indirect manner. The side elements 30,32 are held together in being pivoted to a transverse carrier member 36 by means of pins 34. As shown to the left in FIG. 2 the elements may be held together in a position in which they form a tray with a triangular cross section, and they are stabilized in this position by means of pivot arms projecting straight towards each other from respective pivots 38 at the upper, outer corners of one of the tray gables, while at the middle of the gable they are pivotally interconnected-by means of a protruding pin 42. The carrier member 36 has a bent out plate portion 44, by means of which the tray is carried in its path of movement, driven by the said driving chain. The planar inclined walls 30 have upper extensions 31, and the gable plates 32 may be correspondingly extended.

The tray may be opened by an upward pull in the middle pin 42, as the pivot arms 40 will then effect a pulling together of the upper corners of the tray during pivoting of the tray parts 30,32 about the fixed pins 34. Thereby the tray may be brought into the position shown to the right in FIG. 2, i.e. a fully open position, in which the formerly inclined side/bottom plates 30 are now vertical and interspaced. Thus, nothing can prevent the contents from falling down, even if there are sticky articles, and the opening may be effected in a rapid and precise manner, such that the contents may be let out precisely at a selected place, i.e. above any selected container 22, and even simultaneously or otherwise coordinated with the delivery of articles from other trays for the building up of desired combination weighing portions.

For effecting the tray opening simple, displaceable ramp elements 46, FIG. 2, may be used, which, actuated by control means 48, may be switched between a passive, e.g. raised position, in which the pins 42 on the trays 12 may pass freely, and an active engaging position, in which an arriving pin 42 will hit into the ramp 46 and thus rapidly be forcibly lifted to the raised position shown to the right in FIG. 2, i.e. so as to open the tray rapidly and totally.

Such actuator units 46, 48 are mounted regularly spaced along the moving path, typically at the leading end of each of the receiver containers 22, but possibly also with a smaller spacing, e.g. if the collected articles or portions are to be delivered to an underlying conveyor having a smaller compartment pitch.

A decisive function is a correct weighing of the trays, and as these are here depending below their supported portions 44 they cannot be weighed merely by introduction into a traditional dynamic weighing station. However, as indicated above, the trays can be lifted during their passage of the weighing station such that they will act on the weighing system solely with their proper weight. This is very schematically shown in FIG. 3, where there is inserted in a set of guiding rails 50 a weighing station 52 having carrier belts 54 in a higher level. In practice the system will be made so as to comprise at either side of the moving path a weighing cell for the associated end of the tray, or, alternatively, a single weighing cell at one side and two mutually spaced weighing cells at the other side, such that a very reliable three point weighing of the passing articles is achievable.

In the following, various details of a preferred design of the system will be discussed in more detail.

When the trays move in the transitions between the straight side runs and the half circular end runs the outer ends of the trays are subjected to a marked acceleration and deceleration, respectively, which may give rise to wear and shakings. A small compensation occurs when the trays engage the chain in two spaced points, as these will then pass the points of transition with some time difference. Thus, at the entrance to a curved run the leading point of engagement will enter the curved run while the rear point will still be moved at a straight line, i.e. the tray will be swung forwardly about the rear point with an acceleration rising gradually from zero, but then decreasing abruptly when the rear point passes the point of transition; then the tray will have reached the position relative the chain, in which it will remain during the entire curved course, until a correspondingly sudden beginning and smooth termination of the straightening out of the tray takes place at the following transition to a straight run.

However, the whole change still occurs during a motion of just a single tray width, so abrupt changes will still occur, and it is desirable to decrease the associated impacts.

According to the invention this is achievable in arranging for only one of the said engagement points to positively engage with the driving chain along the curved runs, while the other engagement point is brought to engage with a guiding rail extending along a path deviating from that of the driving chain, viz. such that the trays will thereby carry out their out-and inbound pivoting in a smoothly progressing manner over a length considerably larger than the tray width. Already a doubling of this length will imply a substantial reduction of the adverse effects, and correspondingly also the remaining, sudden change of motion can be smoothed.

For the very driving of the trays it is of course sufficient that the trays are drivingly connected with the chain in but a single point, and the other point of engagement, therefore, may by located in such an offset manner that by the motion of the tray it will be engageable with the said guiding rail outside the run of the driving chain.

Preferably the rear point of engagement is selected as the chain contacting point, whereby it is the leading point that should be free to leave the chain and be guided along a rail, which, in principle, will extend as a half-ellipse outside the halfcircular path of the chain. However, in connection with the discussed turntable 14 it is desirable that the tray position be kept constant along an outermost run of somewhat less than 90°, viz. corresponding to the location of the openings 16; along this stretch, therefore, the outer guiding rail should extend along a circular path, concentrically with the chain. The special arrangement will imply that the openings 16 should occur with their longitudinal direction inclined relative to the radial direction, this being shown in FIG. 4, in which the arrangement is schematically illustrated.

In FIG. 4 it is indicated that at their rear ends the trays 12 are pivotally connected with an endless chain 60 by means of pivots 62, while at their front end they the slidingly engage a guiding rail 64 by means of slide pins 66. The chain passes about sprockets 68, of which only one is shown. At its tangential arrival at the sprocket 68, at A, the chain procedes in a half-circular run ABCD, while the rail 64 continues in a less curved stretch between A and B, then in a stretch concentric with the chain between B and C, outside the chain, and back to its straight stretch through a smooth curve between C and D. The transitions at all of the four places are softly curved.

It will be understood that the trays by their passage from A to B will be pivoted smoothly and slowly to a position which is obliquely radiating from the wheel 68 and is thereafter maintained at the stretch B-C, while along the stretch C-D the trays, relatively fast but still smoothly, will be return pivoted to their position normal to the chain. The stretches A-B and C-D may extend over some 45°, and when the pivotings of the trays are distributed over such lengths there will be no harmful shakings of the system.

As mentioned, it is not unknown to use trays or bowls moved in an endless row and passing a dynamic weight. An elementary solution is to mount a belt weigher in the transportation path, whereby the bowls should just be advanced on the weighing belt through the time and length required for a weighing with an acceptable accuracy. However, the bowls should then follow each other with a certain mutual spacing, because the weighing of a bowl cannot start until the preceding bowl has left the belt. In the said EP-A-0,534,889 the bowls are of a design corresponding roughly to FIG. 2, and a juxtaposed mounting of the bowls is enabled by each bowl being stabilized by means of a system of parallel levers which allow for some vertical movement of the bowls, while these, at a gable side thereof and in a relatively low level, are provided with a support roller which, when passing the weighing station, runs on a weighing rail. Seen from this rail the bowls will be reduced to points, and a new bowl point can be introduced on the rail as soon as the previous point has left it; hereby the bowls can be arranged closely juxtaposed, when the same length dimension can apply to the bowls and the weighing stretch, respectively.

In a preferred embodiment of the invention it is undesirable to use the said parallel levers, which may well be suited in a pure carrousel structure, but hardly combined with a chain drive through curved and straight runs. In FIGS. 2 and 3 it is indicated that it is possible, instead, to use supports 44 placed at a relatively high level at the middle of both gables of the bowls. These high level supports, shaped as plates 44, may support the bowls in a stable manner on the belts 54 when these, as required, cause the bowls to be lifted free of their connection with their endless propulsion means (see below), the plates 44 being short enough to be, if not point shaped, then at least considerably shorter than the bowls, whereby these may be arranged closely juxtaposed.

However, even for the invention it would be ideal to operate with point engagements between the bowls 12 and the weighing belts 54. On the face of it this will be unrealistic, as the free-lifted bowls, not otherwise supported, could then tilt in an uncontrolled manner all according to the load distribution; it has been realized, however, that it is in fact possible to use a mono-or bilateral double point support for generally stabilizing the bowls, while these, seen from the weighing belts, will still be point shaped. This will be a matter of arranging for such a support of the bowls that mutually spaced carrier pins thereof are advanced along separate conveyor tracks, from which they may be concurrently delivered to the the weighing belt and later again be concurrently released therefrom. For the required stability of the bowls it is sufficient if such a stabilizing engagement occurs only monolaterally, as at the other side it is then possible to use but a single support pin for bringing the bowl along the weighing belt in point engagement therewith. When the opposed, mutually spaced carrier pins are brought to and from the weighing belt means, guided or carried individually, the result will be that each successive bowl, despite a broad support thereof, will load the weighing system only pointwise, whereby in practice the bowls can be arranged closely juxtaposed for securing a high capacity of the system.

Such a system is shown schematically in FIGS. 5–7. The bowls are provided with a single, projecting carrier pin 70 at one side and with two pins 72 and 74 at the other side, where the pin 72 is the leading one. The bowls are advanced with these pins resting on carrier rails 76 and 78, of which the rail 78 carrying the pins 72 and 74 is divided into two parallel branch portions 80, 82 adjacent the weighing station; the weighing belt 541 at this side is longer than the opposed belt 54.

Both of the rail portions 80 and 82 have an interruption, as they have downwardly sloping ends 801 and 821 at the inlet end of the belt 54, while further ahead they continue from upwardly sloping ends 80" and 82" into the single rail 78. The rail portions 80 and 82 are shown located at either side of the belt 54; the pins 74 project over the belt, but not to the rail 82, while the pins 72 project so as to be carried by the latter, yet not by the rail 80, inasfar as they have a lower recess 84, FIG. 7, right above the rail 80.

It will be noted from FIG. 5 that the rail ends 801 and 821 are mutually spaced corresponding to the distance between the pins 72 and 74 on the single bowls. Consequently, both pins will be lowered onto the belt 541 concurrently with the rail 76 producing a corresponding lowering of the pin 70 onto the other belt 54. The stretch forwardly to the rail ends 80" and 82", which are correspondingly mutually spaced, may now be used for the weighing of the bowl. The pin 72 will pass along the rail 80, but due to the said recess 84, FIG. 7, this will not influence the pin, such that during the weighing course the bowl will be entirely free of the carrier rails.

The pins 72 and 74 will reach the respective rail ends 80" and 82" at the same time and simultaneously with the pin 70 reaching a corresponding rail end 76", i.e. the entire bowl is then raised off the belts 54,541 and continues, driven by the chain, along the rails 76,78. It is of course a condition that the weighing belts should accommodate but a single bowl at a time, and if the active weighing stretch is desired to be long, the distance between the bowls should be equally long. Inversely, the system will enable the bowls to be closely juxtaposed if it is acceptable that the weighing stretch be as short as given by the length dimension of the bowls. As shown in FIGS. 5 and 6 the bowls may then follow each other closely, as emphasized above. The rail portions 80 and 82 may well be located at the same side of the belt 541, and the system may be modified such that one or more of the pins are located in different levels; the pins sliding on the carrier rails will not have to be the same as those engaging the belts.

In FIGS. 5–7 it is left open how the bowls are driven, as this is not directly relevant. In practice, however, it is important that the bowls, being in driving connection with e.g. a chain drive, be coupled free of this drive in the weighing station, such that the bowls are left entirely to themselves as long as they are advanced on the driven weighing belts 54, 541. For avoiding weighing noise this will be highly preferable over a compulsory movement of the bowls effected from the outside as according to said EP-A-0,534,889.

One possibility of such a free coupling is shown in FIG. 8, which indicates that one of the said pins or a special driving pin 86 on the bowls may engage a driving chain 88 having special link plates 90, in which there is provided a forwardly expanding opening 92, the rear end of which serves to push the pin 86 and thus the bowl forwardly. Here, the weighing belt system 54, 541 is adapted to move slightly faster than the chain 88, whereby the bowl and therewith the pin 86 is moved forwardly in the opening 92, such that the pin 86 will entirely leave its engagement with the chain 88 as long as the weighing is going on. After the weighing the chain will catch up with the bowl and reestablish the driving engagement with the pin 86.

This system shows the advantage that the bowls are well entirely liberated for the weighing operation, but still potentially engaging the chain such that they are further conveyable if they have been stopped temporarily, e.g. by a current breakdown.

FIGS. 9 and 10 show another and even preferred solution in which the bowls are carried by frame elements 94, which are preferably cast of reinforced plastics and integrally provided with the relevant details such as bearings for the pivot pins 34 of the bowl (FIG. 2). The frames 94, which may be used for bowls of different sizes, slide on the rail 76 with a foot member 96, while at the opposite end there is both a corresponding foot member 97 and a pin 98 depending into a guiding groove in the carrier rail 78. The driving chain 100 is housed in an upper hollow rail 102 and is provided with link blocks 104 holding a depending pin 106, which at its lower end has a conical body 108 with an upper, outwardly projecting collar 110. The pin 106 is downwardly spring biased, and the conical body 108 is received in a conical hole 112 in the frame 94, whereby a foremost driving engagement with the the frame is established.

At the entrance to the weighing belt 54 the collar 110 of the conical body hits an inclined ramp 114, which raises the unit 106, 108, 110 and then keeps it raised during its entire passage on the belt. As shown to the left in FIG. 10 the engagement will hereby be effectively broken, and in this case the weighing belts are driven at the same speed as the chain 100 such that normally there will occur only very small or indeed no displacements between the parts 108 and 112 during the weighing, where thus the frame/bowl units are left entirely to themselves. Also here, a driving connection can be established in special situations, as the conical body 108 is not entirely lifted free of the hole 112. After the weighing the conical body 108 is lowered to its normal position in which it fits in the hole 112 without exerting any considerable pressure.

It is advantageous that the bowls will not have to change their speed at their arrival at the weighing station, and it should even be endeavoured to guide the bowls in a straight line onto the weighing belts in order to reduce weighing noise as much as possible. Thus, the rails 80 and 82 in FIG. 6 should be lowered somewhat.

The illustrated frame 94 is adapted to cooperate with a weighing station of the type shown in FIG. 3, but it may well be designed to cooperate with a station according to FIGS. 5–6.

Comparing with FIG. 4 it will now be the conical member 108 that drives the bowl in the inner path around the sprocket wheel 68, while the rail 78 guide the pins 98 through the outer path. It is only required to add a carrier rail for the point or points at which the bowl or the frame is supported on the rail 78 in the straight runs.

When it is thus the foremost pin which is driving and when—like in FIG. 4—there is selected an exterior course of the rail 64, then the pivot phases of the bowls will be opposite to FIG. 4, i.e. with the relatively rapid pivoting along the stretch A-B and the slower pivoting along the outlet phase C-D.

This also appears from FIG. 11, in which the cover disk 14 has its holes 16 adapted according to the orientation of the bowls along the stretch B-C.

Moreover, FIG. 11 shows that above the disk 14 there is mounted, on a central hub 116, a radial arm 118 having at its outer end a plate 120 with a shape and orientation corresponding to each of the holes 16. The plate 120 may be kept parked in the illustrated inoperative position, but by means of suitable actuation means the arm 118 may be coupled with the disk 14, such that the arm is co-rotated through a single revolution with the plate 120 covering one of the holes, as indicated in dotted lines. What is intended is that a selected bowl should not receive any material at all in the filling station, as it is then possible to currently check the tare weight of the bowls without any marked reduction of the capacity of the system. For example, such a weighing may be made for every tenth movement cycle of each of the bowls.

As shown in FIG. 12 the holes 16 in the disk 14 may be provided at the bottom of funnel shaped depressions 17, whereby rollable articles are easier to handle.

The system design according to FIG. 1 is advantageous also in that the central space between the plates 10 is usable as a covered machine room which may contain e.g. actuators for the actuating ramps 46 (FIG. 2); these may be switchable laterally or vertically. Also, the said room may house some spare bowls for rapid mounting in the frames 94, should bowls therein be damaged.

FIG. 13 schematically shows a corresponding system, where beneath a row of receiver cells 221 at each side there is mounted a longitudinally extending conveyor belt 23 that may bring portions or articles delivered from the cells 22 to a transverse conveyor 25. As already mentioned, it will then be possible to let the system carry out different types of grouping work based on a methodic weighing of the delivered and optionally merged article portions. The system is well suited to be built with a high number of receiver cells 22 , such that for combination weighing there are rich possibilities of finding articles or portions for merging, such that a high working capacity and good results as to minimized loss involving overweight in the portions will be achievable. Besides, a noticeable saving is obtainable thanks to the system being able to operate with no or very little attendance once the desired job or jobs of the system having been read in.

When supplying a flow of articles to be delivered according to specific criteria, there may be some risk that articles may occur which will not fit anywhere. Conventionally, such articles will proceed to collection or recirculation at the outer end of a conveyor, but with the present system it is possible to use for such a collection the container or cell 22 located as the last one in the return path to the feeding station, whereby these collected articles are automatically delivered closely next to this station. Moreover, an immediate recirculation will be possible, viz. simply by passing the already filled bowl through the feeding station, optionally covered by the plate 120, FIG. 11.

FIG. 14 shows a modification, where the belts 23 are replaced by two belts 231 at either side, conveying towards a central receiver area with an outfeed conveyor 251. Correspondingly, as shown in FIG. 15, broad belts 23" may be used for conveying inwardly to a longitudinally extending outfeed conveyor 25. The purpose of these layouts is to promote a rapid merging of combination portions on the outfeed conveyor, without in the meantime blocking delivery of new portions The invention has now been described with reference to the illustrated, preferred system, but the principle of the invention extends much further. In that system the said grouping of the unorderly article flow is effected in a fully integrated manner, in the last moment before the delivery of the articles to the bowls, and already this function may be modified, see e.g. FIG. 16.

In FIG. 16 is shown a row of closely juxtaposed bowls 12 which, along an infeed stretch, is advanced beneath a belt/chain 122 made of transverse lamellas 124, which, during the conveying, are located just above the gaps between the consecutive bowls 12. The unorderly flow of articles is supplied through a pipe 13 for being laid out on the lower run of the chain 122. The lamellas 124 will ensure that no article can be delivered lying over two bowls 12, assisted by a scraper brush 18". At the delivery end of the lower chain run there is provided an obliquely outwardly guiding scraper blade 126 which will guide non-deposited articles out for collection in a special container. It will thus be ensured that the supplied articles, whether they are hard and rollable or are flat and sticky, will be deposited in a well defined and fully isolated manner in the single bowls, such that a weighing inaccuracy due to article overlapping between the bowls will not occur anywhere.

However, the invention is not limited to this grouping taking place in immediate connection with the delivery of the articles to the bowls, as it will be just as effective if the article flow be divided beforehand into separate portions, which may then, in a more uncritical manner, be synchronously transferred to the consecutive bowls for pre-elimination of the said overlapping problems. In the following this will be described in more detail.

The system shown in FIG. 17 comprises a conveying weighing belt 132 forming part of a dynamic weighing station 134, which includes or is connected with a computer for registering the weight of articles moved on the belt 132. This belt brings the articles to an outlet belt 136 having along one or both sides a row of receiver containers 138. At the top of the belt 136 diverter means are provided, operable by means of the computer to effect a lateral movement of the advanced articles for selective delivery thereof to the containers 138 all according to the registered weight of the articles. Typically, for this selectively actuated wipe-off movement there is used a diverter plate 140 which, from a swung-out outer position shown in dotted lines, is inwardly pivotable about a shaft 142 into a diverter position obliquely crossing the belt, wherein the plate 140 will divert a conveyed article outwardly for delivery into the associated receiver container 138. The pivoting of the plate 140 is controlled by a cylinder 144, which is actuated by the weighing station 134 for acting on a radially projecting arm on the shaft 142.

Each of the containers 138 has an openable bottom plate 146, controlled from the station 134, and along which the container contents may slide down to an underlying conveyor belt 148 extending along the row of containers 138.

Thus, each article having passed the weighing belt 132 may be sorted out to any of the containers 138 all according to the article weight, as well known per se.

In front of the weighing belt 132, according to the invention, there is mounted a feeding belt 150, which is driven with a velocity that may be higher than the speed of the weighing belt 132, e.g. 30–60 meters per minute and some 80 m/m, respectively, while the following belt 136 may be driven slightly slower than the weighing belt 132, or preferably with the same speed, e.g. 70 m/m. However, the invention is not limited to special speed conditions, and it may even be advantageous to work with the same or successively decreasing speeds.

Above the feeding belt 150 a feeding conveyor 152 is arranged, receiving from a pipe mouthing 154 or in any other manner an even—or maybe uneven—flow of articles to be weighed out in portions. These articles are advanced on the belt 152, e.g. by means of dogs 156, and are brought to fall down on the feeding belt 150.

A special conveyor 158 is provided in the space between the conveyors 150 and 152 with the task of advancing entrainment plates 160 along the top side of the belt 150 and returning them along an upper, inoperative run. As shown, these plates are curved in the transverse direction such that at their front sides they will act collecting at the articles supplied from above, when they are moved along the belt 150 with a speed lower than that of this belt, e.g. with a speed of 30–60 meters per minute. The speed of the feeding belt 150 may be considerably higher, e.g. 30–60 m/m, whereby the fallen articles will relatively rapidly be grouped together against the curved rear side of the plate 160. Above, this plate was denoted an entrainment plate which is not fully correct according to common terminology, as it does not push the articles forwardly, but rather acts to retard articles that would otherwise be moved still faster on the belt 150, such that the articles retarded are collected in a group 162 at the rear of the plate 160 before such group is delivered to the weighing belt 132 by a swinging up of the plate 160 at the rear end of the belt 150.

The conveyor 158 operates with one or more additional cross plates 160 which, in being successively guided down to and forwardly along the feeding belt 150, will ensure that the flow of articles as supplied by the conveyor 152 will consequently be delivered as joined and mutually spaced article groups 162 to the weighing belt and therewith also to the following sorter belt 136.

Thereafter the article groups 162 may be sorted out to the receiver containers 138 just as it is known to sort out single articles according to their weights.

The weighing unit/computer 134 may detect whether the article groups 162 do appear at optimum rate, and the unit may feed-back control the speeds of the conveyors 152, 150 and 158 for optimizing the article supply.

Moreover, the weighing computer 134 may decide whether article groups already weighed out into the containers 138 should most suitably wait for a further portion 162 for filling up to full weight, or whether the same full weight could better or as well be established by merging partial portions from a number of the containers 138. This in its turn may require the belt 148 to be controlled to move stepwise for ascertaining that partial portions from these containers are let out for accumulation at the same place on the belt. Alternatively, the portions may be let out onto the moving belt 148 and be brought therefrom to a packing unit or a further conveying belt 149 which is kept stillstanding while receiving the partial portions.

For the invention it is important that a supplied flow of articles be separated in mutually separated portions delivered to the weighing belt 132, preferably without the associated grouping being conditioned by delays in the supply flow, as this would imply a lowered supply capacity. Such a grouping is obtainable in many ways, but particularly at high speed operation it is required to consider the type and condition of the actual articles.

If the articles are suitably large it can be advantageous to use a grouping unit as shown in FIG. 18, where, underneath the upper run of a belt conveyor 170 with a plurality of belts, there is mounted a moving system for fingers 172, which are rowwise upstanding between the belts. The fingers 172 may be used either for a retarded conveying of articles on a still faster driven belt 170 or, inversely, for actively pushing the articles forwardly on a slower moving belt; at the extreme the belt 170 may stand still and thus be replaced by a fixed plate support. Something similar could apply to the belt 150 in FIG. 17, where the associated pusher plates 160 would then have to be inversely curved in order to act laterally to collect on the articles.

Optionally, the grouping means 160, may be so adapted that at the delivery of the article portions they will affect these with a throwing impact for safe transfer to the weighing belt 132.

It will be a further possibility for obtaining the desired grouping to cause the articles to be scraped down into pocketlike outlet depressions in a belt that is moved along with the belt 150, with the same speed, the depressions being open at the bottom, but closed by abutting the belt 150. When the depressions are swung up at the delivery end of the belt 150 they will leave the article portions in tightly collected formations for transfer to the weighing belt 132, optionally for a direct transfer to this belt.

For achieving the desired grouping it will not be a necessity to use special entrainment or separation means, as a corresponding effect is obtainable with the use of a length variable feeding conveyor that can be projected forwardly for the collection of an outer article group and then be rapidly retracted for joined delivery of the group by its falling down on an underlying belt.

FIG. 19 shows a system comprising a bowl conveyor 180 having bowls 182 driven in a closed path with opposed straight stretches and curved ends. Above one of the straight stretches a feeding belt 184 is mounted, feeding an unorderly flow of articles to the system and delivering the articles to fall down onto a fixed plate 186 slightly below the lower run of this belt. Between the two parts 184 and 186 a shuffle plate 188 is arranged, which, by means of a cylinder 190, can be projected over or along the plate 186 for shuffling off the articles on this plate and causing them to fall down onto an underlying belt 192 provided with dogs 194. From the latter belt the articles are brought to fall down onto the bowl conveyor 180, whereby the articles are groupwise received in the bowls or trays 182.

The belt 192 is a weighing belt which, in a manner not shown, is suspended in an overlying carrier chassis that may be provided with means for weighing the entire belt unit 192 and therewith also for effectively weighing the article portions successively advanced thereon. Alternatively, the unit can be a regular dynamic weigher, where the upper run of the belt passes over a weighing device placed between the upper and the lower run of the belt.

The cylinder 190 is actuated with even, suitable time intervals for projecting the shuttle plate 188 relatively rapidly, such that the articles received on the plate 186 are brought down as a joined group to the belt 192 between two dogs 194. The shuffling plate 188 has an upper, rearwardly projecting plate 166 which, during the shuffling movement, will receive articles supplied from the feeding belt 184, while by the return movement of the plate 188 these articles will be delivered to the plate 186 by hitting the front end of the belt 184.

It will be appreciated that the articles supplied in an unorderly flow on the belt 184 will hereby be separated into article portions which can be weighed on the belt 192 and thereafter be delivered to respective receiver trays 182 in the endless tray conveyor 180.

The conveyor belt or belts used may advantageously be provided with transverse dogs, which will secure a steady separation between neighbouring portions and, for control purposes, a clear positioning of the single portions, even when the portions comprise easy-to-roll articles. Such a separation by dogs will be suitable also on the weighing belt and, optionally, on the preceding belt, all according to the manner of effecting the separation between the articles or article groups. By the dynamic weighing the dogs will have no influence on the weighing result when it is the whole weighing belt that is weighed.

In FIG. 19 it is indicated that in connection with the trays 182' there may be arranged one or more externally located trays 182, which are advanced along a carrier chassis together with the inner tray 182 and are individually controllable for letting out the collected articles or article groups. Each additional row of such added trays 182', as far as the feeding is concerned, may be served by a separate feeding station arranged in parallel with the station 184–198, and for the reception of articles from the additional trays the underlying receiver system can be correspondingly built out, whereby a considerable increase of the capacity is obtainable with the use of one same basic moving system for the circulating movement of the trays 182 or the trays 182 and 182', respectively.

It should be noted that the differentiated distribution system can be used not only for the merging of similar articles, but certainly also for the merging of mutually different articles, e.g. different pieces of poultry, such that it can be ascertained that arriving partial pieces are combined into representative portions containing all the partial pieces. Moreover, it will be possible to operate with different articles that are kept entirely separated, fed via respective feeding stations.

In FIG. 20 it is shown that it is easily possible to arrange for an article supply from a single belt 184 to two feeding stations, when using diverters 185 for a lateral guiding out of separate flows of the articles at different places and/or to opposite sides.

It is of course decisive that the articles or article portions delivered from the weighing belt 192 be transferred in a well defined manner into the respective receiver trays 182. In particular, when easily slidable or rollable articles are concerned, such articles may well be located immediately next to the entrainment ribs 194, and in practice it will be difficult to ensure that all articles between two such ribs are delivered to one and only one passing tray 182. For improving on this it can be chosen, according to the invention, to operate the weighing belt with a relatively high speed, while the shuffle plate 188 is actuated at such intervals which, for the belt 192, will correspond to a reception of goods in every second compartment between the ribs 194. With a suitable synchronisation the unloading of goods from the belt 192 may then take place during the passage of an intermediate length of the receiver tray 182, whereafter the trays will reach to be moved for bringing a new tray in position, before the next portion is correspondingly safely unloaded. The unloading will be entirely stopped during the passage of the interfacing sides of the trays, whereby the unloadings will be correct according to the recorded weighings.

The equipment will also be usable for the handling of single articles, when only these are fed one by one with a suitable spacing. With the use of combination weighers it is customary that one or more operators carry out a manual feeding of the single articles, but in the present connection it should only be checked that the automatically supplied articles are not located too close to one another.

A feeding of article portions combined with the making up of the portions from an even flow of articles may, alternatively, be effected as shown in FIG. 21. The article flow 189 is advanced on a belt 184 next to a weighing or transfer belt 198, and along the opposite side there is arranged a longitudinally extending, welled shuffle plate 195 with compartments corresponding to the pitch of the entrainment ribs 19 of the belt. When the plate 195 is pushed towards the belt 198, e.g. by means of a cylinder 197, separate article portions will be confined within the said compartments and will be transferred to the belt 198 by falling down into the spaces between the ribs thereof. This transfer may be effected during stillstand or movement of the belts.

A corresponding portioning may be effected as shown in FIG. 22 by means of a straight plate 194 serving to push out the articles to an area above the belt 198, where there is arranged a system of inverted V-shaped lamellae 200, between which the articles will slide down along steep sides to the underlying belt 198 for delivery to the areas thereof between its entrainment ribs 191.

What is claimed is:

1. An infeed system for receiving a flow of articles, including foodstuff articles of semi-soft and sticky types, and feeding said articles or groups of such articles to a dynamic weight determining unit requiring the successive articles or groups of articles to be located and mutually spaced according to preset operational conditions, the infeed system having a receiver port for said flow of articles or article groups arranged in accordance with said operational conditions, wherein in a path between said receiver port and said outlet conveyor there is provided means operable for performing compulsory actions on said articles to effectively divide the supplied flow of articles into mutually fully separated articles or article groups complying with said operational conditions whenever the articles as received do not already comply with these conditions.

* * * * *